(12) United States Patent
Kang et al.

(10) Patent No.: US 8,499,056 B2
(45) Date of Patent: Jul. 30, 2013

(54) REMOTE USB SYSTEM FOR SUPPORTING MULTIPLE VIRTUAL MACHINES OF MULTIPLE HOST AND METHOD THEREOF

(75) Inventors: Dong-Oh Kang, Daejeon (KR); Hyung-Jik Lee, Daejeon (KR); Jeun-Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 332 days.

(21) Appl. No.: 12/881,396

(22) Filed: Sep. 14, 2010

(65) Prior Publication Data

US 2011/0107003 A1   May 5, 2011

(30) Foreign Application Priority Data

Nov. 5, 2009   (KR) .................. 10-2009-0106429

(51) Int. Cl.
   *G06F 15/16*   (2006.01)
(52) U.S. Cl.
   USPC ............ 709/217; 709/208; 709/226; 709/229
(58) Field of Classification Search
   USPC .................. 709/217, 208, 226, 229
   See application file for complete search history.

(56) References Cited

U.S. PATENT DOCUMENTS

| | | | |
|---|---|---|---|
| 8,028,040 B1* | 9/2011 | Hobbs et al. | 709/219 |
| 8,150,971 B2* | 4/2012 | Lublin et al. | 709/226 |
| 2005/0240685 A1* | 10/2005 | Keys | 710/8 |
| 2007/0011374 A1* | 1/2007 | Kumar et al. | 710/105 |
| 2009/0006702 A1 | 1/2009 | Sarangdhar et al. | |
| 2009/0132737 A1* | 5/2009 | Huang et al. | 710/62 |
| 2009/0150550 A1* | 6/2009 | Barreto et al. | 709/228 |

FOREIGN PATENT DOCUMENTS

| | | |
|---|---|---|
| KR | 10-2006-0083116 | 7/2006 |
| WO | 2005/089139 | 9/2005 |

* cited by examiner

*Primary Examiner* — Nicholas Taylor
(74) *Attorney, Agent, or Firm* — Staas & Halsey LLP (57) ABSTRACT

There is a master server according to an embodiment of the present invention that includes: a remote USB information manager receiving information on a USB device connected to a remote USB bridge from the remote USB bridge and managing the received information; a virtual machine information manager receiving information of a user's virtual machine from a virtual machine host server and managing the received information; a user request processor, in accordance with a request of a user who wants to access a predetermined USB device on the remote USB bridge, extracting information on the corresponding USB device from the remote USB information manager and extracting the information on the user's virtual machine from the virtual machine information manager; and a remote USB connection controller connecting the user's virtual machine to the predetermined USB device by using the information extracted by the user request processor.

15 Claims, 6 Drawing Sheets

REMOTE USB SYSTEM FOR SUPPORTING MULTIPLE VIRTUAL MACHINES OF MULTIPLE HOST AND METHOD THEREOF

CROSS REFERENCE TO RELATED APPLICATIONS

This application claims priority to Korean Patent Application No. 10-2009-0106429 filed on Nov. 5, 2009, the entire contents of which are herein incorporated by reference.

BACKGROUND OF THE INVENTION

1. Field of the Invention

The present invention relates to a remote universal serial bus (USB) system for supporting multiple virtual machines of multiple hosts and a method thereof. More particularly, the present invention relates to a remote USB system connecting a remote USB device existing on a network to multiple virtual machines operating on a plurality of virtual machine host servers by a plug and play scheme or a user's request and a method thereof.

2. Description of the Related Art

Since a known remote USB method is implemented by focusing on a connection between a single host and a remote USB device, it is difficult to use and allocate the remote USB device to a plurality of virtual machines on a plurality of hosts.

Further, a virtual machine user on the host should know all of the information on the remote USB device that exists on the network and when a plurality of users request for using one USB device, this request cannot be processed.

As described above, the known remote USB method has a limit to support various remote USB devices in a network environment and the method is inconvenient for the user to use and difficult to prevent a collision among the plurality of users. Therefore, the method cannot show a good effect as expected in using the remote USB device.

SUMMARY OF THE INVENTION

The present invention is contrived to solve the above-mentioned problems. An object of the present invention is to allow virtual machines on a network to use a remote USB device like a local USB device through a master server that stores and manages USB device information and virtual machine information on the network.

Another object of the present invention is to allow a plurality of virtual machine users on a plurality of hosts to use a remote USB device on a network without causing a collision by a plug and play scheme and a user's request.

According to an aspect of the present invention, there is a master server for supporting multiple virtual machines of multiple hosts that includes: a remote USB information manager receiving information on a USB device connected to a remote USB bridge from the remote USB bridge and managing the received information; a virtual machine information manager receiving information of a user's virtual machine from a virtual machine host server and managing the received information; a user request processor, in accordance with a user request to access a predetermined USB device on the remote USB bridge, extracting information on the corresponding USB device from the remote USB information manager and extracting the information on the user's virtual machine from the virtual machine information manager; and a remote USB connection controller connecting the user's virtual machine to the predetermined USB device by using the information extracted by the user request processor In particular, the information on the USB device includes an IP address of the remote USB bridge, USB port information, and information related to hardware of the USB device.

Further, the information on the virtual machine includes: an IP address, an operating system, and hardware related information of the virtual machine host server; and an IP address, an operating system, and hardware related information of the virtual machine.

In addition, the user request processor provides information on the USB devices connected to the remote USB bridge to the user to allow the user to select any one USB device from the USB devices.

Besides, The master server for supporting multiple virtual machines of multiple hosts according to claim 4, wherein the information on the USB devices connected to the remote USB bridge corresponds to USB devices except for the USB device which is occupied by other users.

Moreover, the information on the USB devices connected to the remote USB bridge includes information related to a USB device occupied by other users.

Further, the user request processor receives and registers a type of a USB device which the user wants to connect from the user and when the USB device of the registered type is connected to the remote USB bridge, the user request processor connects the USB device of the registered type to a virtual machine of the user.

In addition, the user request processor receives and registers a remote USB bridge which the user wants to connect from the user and when the USB device is connected to the registered remote USB bridge, the user request processor connects the USB device connected to the remote USB bridge to the virtual machine of the user.

Meanwhile, according to another aspect of the present invention, there is a remote USB bridge for supporting multiple virtual machines of multiple hosts that includes: a USB device manager including a plurality of USB ports and managing information on USB devices connected to the USB ports; a master server connector receiving the information on the USB devices connected to the USB ports from the USB device manager and transmitting the information to a master server and receiving a remote USB connection command and information on a virtual machine of a user from the master server; and a remote USB connector connecting the USB devices connected to the USB ports to the virtual machine of the user existing on a virtual machine host server by using the received information on the virtual machine of the user when the remote USB connection command is received from the master server.

In particular, the USB device manager is operated by a plug and play scheme.

In addition, the information on the USB device includes an IP address of the remote USB bridge, USB port information, and information related to hardware of the USB device.

Further, the information on the virtual machine includes: an IP address, an operating system, and hardware related information of the virtual machine host server; and an IP address, an operating system, and hardware related information of the virtual machine.

Meanwhile, according to a first aspect of the present invention, there is a method of allocating a remote USB device in a remote USB system for supporting multiple virtual machines that includes: receiving and storing, by a master server, information on USB devices connected to a remote USB bridge from the remote USB bridge; receiving and storing, by a master server, information of a user's virtual machine from a virtual machine host server; providing the stored information on the USB devices to the user in accordance with a request of a user and allowing the user to select any one USB device from the USB devices; extracting information on the selected USB device and transmitting the extracted information to the virtual machine host server in addition to a remote USB connection command; and extracting the information on the user's virtual machine and transmitting the extracted information to the remote USB bridge in addition to the remote USB connection command.

In particular, the stored information on the USB devices corresponds to USB devices except for the USB device which is occupied by other users.

Further, the stored information on the USB devices includes information related to USB devices occupied by other users.

In addition, the information on the USB device includes an IP address of the remote USB bridge, USB port information, and information related to hardware of the USB device.

Besides, the information on the virtual machine includes: an IP address, an operating system, and hardware related information of the virtual machine host server; and an IP address, an operating system, and hardware related information of the virtual machine.

Meanwhile, according to a second aspect of the present invention, there is a method of allocating a remote USB device in a remote USB system for supporting multiple virtual machines that includes: receiving and registering, by a master server, a desired type of a USB device from a user; receiving and storing, by a master server, information on a virtual machine of the user from a virtual machine host server; receiving information on USB devices connected to a remote USB bridge from the remote USB bridge to retrieve the USB device having the type registered by the user; when the USB device having the type registered by the user exists, transmitting information on the corresponding USB device to the virtual machine host server in addition to a remote USB connection command; and extracting the information on the user's virtual machine and transmitting the extracted information to the remote USB bridge in addition to the remote USB connection command.

In particular, the information on the USB device includes an IP address of the remote USB bridge, USB port information, and information related to hardware of the USB device.

Besides, the information on the virtual machine includes: an IP address, an operating system, and hardware related information of the virtual machine host server; and an IP address, an operating system, and hardware related information of the virtual machine.

According to an embodiment of the present invention, the following effects can be expected.

A plurality of virtual machine users on a plurality of host servers can use a remote USB device like a local USB device.

Further, the plurality of virtual machine users on the plurality of hosts can use a remote USB device on a network without causing a collision by a plug and play scheme and a user's request.

DETAILED DESCRIPTION OF THE PREFERRED EMBODIMENTS

Hereinafter, the present invention will be described in detail with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Accordingly, the shape, the size, etc., of elements in the figures may be exaggerated for more explicit comprehension.

Figure 1:
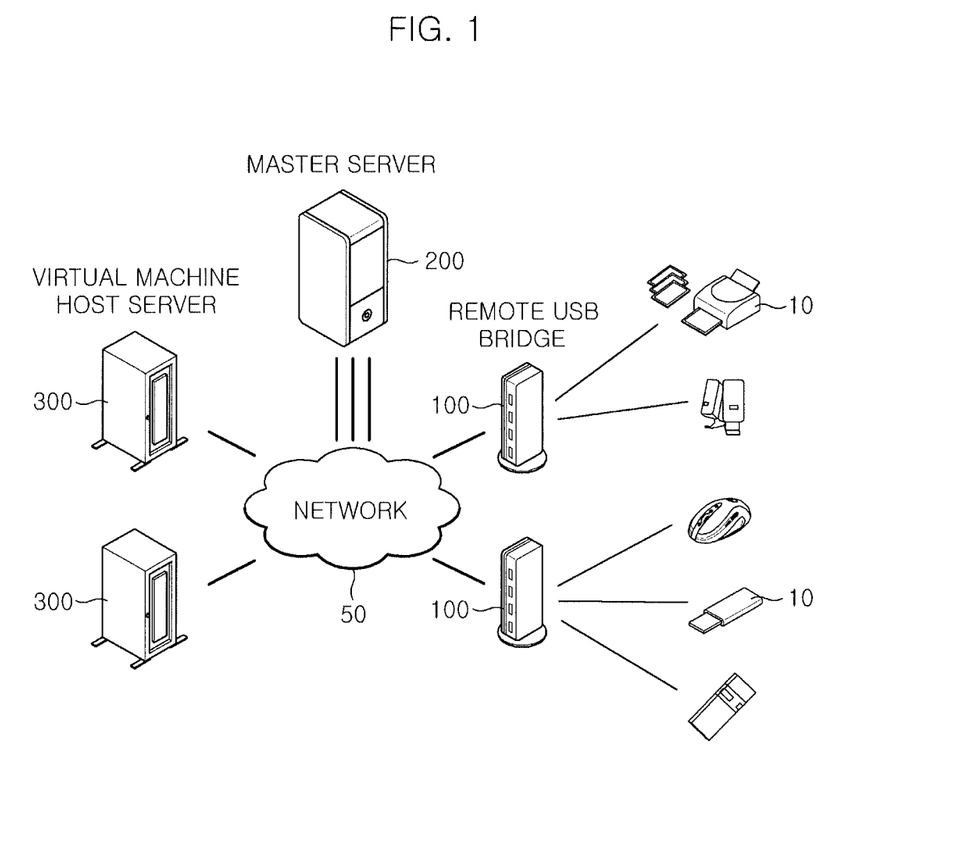
FIG. 1 is a diagram for describing a remote USB system supporting multiple virtual machines on multiple hosts according to an embodiment of the present invention.

FIG. 1 is a diagram for describing a remote USB system supporting multiple virtual machines on multiple hosts according to an embodiment of the present invention.

Referring to FIG. 1, the remote USB system for supporting multiple virtual machines on multiple hosts according to the embodiment of the present invention includes a USB device 10, a remote USB bridge 100, a master server 200, and a virtual machine host 200.

A plurality of various types of USB devices 10 are connected to a USB port of the remote USB bridge 100 through USB interfaces provided in the USB devices 10. The remote USB bridge 100 is connected with the master server 200 and the virtual machine host 300 through a network 50.

The remote USB bridge 100 includes a plurality of USB ports and manages information on USB devices 10 connected to the USB ports. In addition, the remote USB bridge 100 transmits the information on the USB devices connected to the USB ports to the master server 200 according to a request from the master server 200. Herein, the remote USB bridge 100 is operated by a plug and play scheme to recognize the USB devices 10 connected to the USB ports.

Further, when the remote USB bridge 100 receives a remote USB connection command and information on a predetermined virtual machine from the master server 200, the remote USB bridge 100 connects the USB devices connected to the USB ports with the corresponding virtual machine existing on the virtual machine host server 300 by using the received information on the predetermined virtual machine.

The master server 200 receives the information on the USB devices 10 in the remote USB bridge 100 from the remote USB bridge 100 and manages it. Further, the master server 200 receives information on a plurality of virtual machines existing on the virtual machine host server 300 from the virtual machine host server 300 and manages it.

In addition, according to a request of a virtual machine user who wants to access a predetermined USB device on the remote USB bridge 100, the master server 200 extracts information on the corresponding USB device and information on the user virtual machine and connects the user virtual machine on the virtual machine host server 300 with the predetermined USB device by using the extracted information.

The virtual machine host server 300 manages a plurality of virtual machines that are being driven on the host and according to the request from the master server 200, transfers the information on the virtual machines that are being driven on the host to the master server 200.

Further, when the virtual machine host server 300 receives a remote USB connection command and information on a predetermined USB device from the master server 200, the virtual machine host server 300 connects the virtual machine on the host with the corresponding USB device connected to the remote USB bridge 100 by using the received information on the predetermined USB device.

Configurations and functions of the remote USB bridge 100, the master server 200, and the virtual machine host server 300 shown in FIG. 1 will be described below in more detail with reference to FIGS. 2 to 4.

Figure 2:
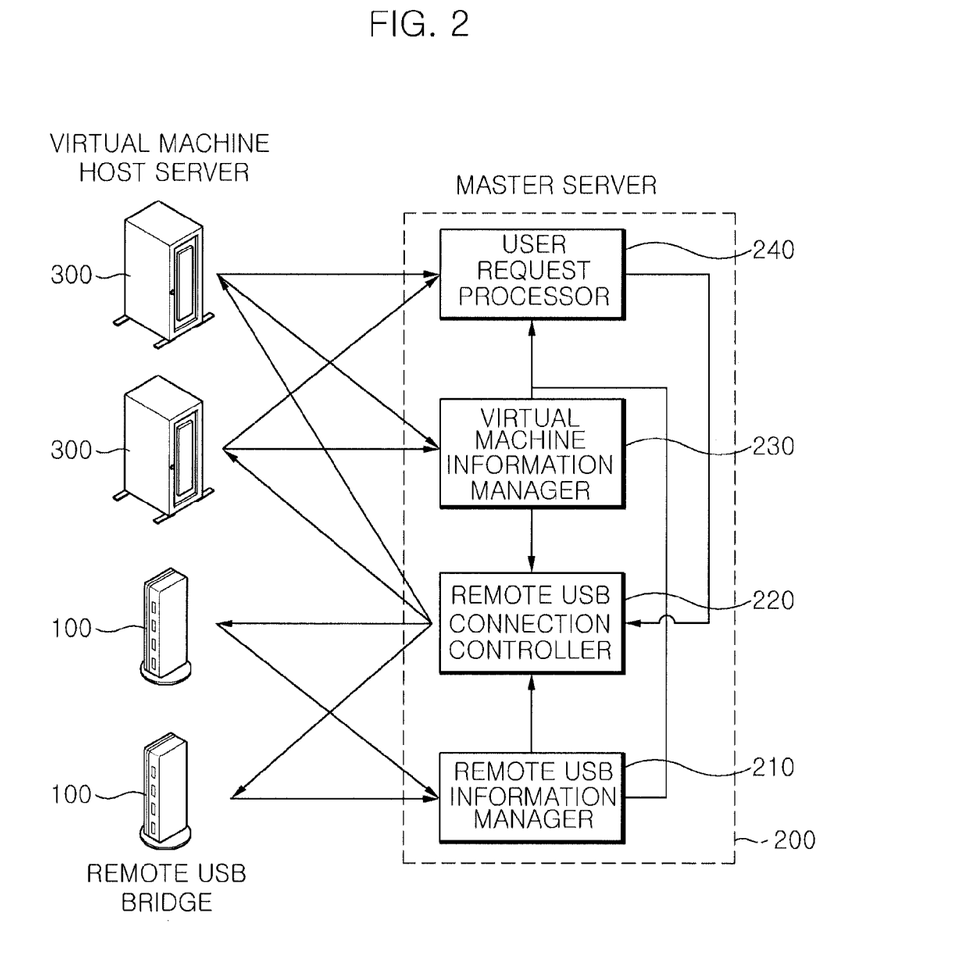
FIG. 2 is a diagram for describing a function of a master server of FIG. 1 in detail.

FIG. 2 is a diagram for describing a function of a master server 200 of FIG. 1 in detail.

Referring to FIG. 2, the master server 200 according to the embodiment of the present invention includes a remote USB information manager 210, a remote USB connection controller 220, a virtual machine information manager 230, and a user request processor 240.

The remote USB information manager 210 receives the information on the USB devices connected to the remote USB bridge 100 from the remote USB bridge 100 and manages it. In addition, according to requests from the remote USB connection controller 220 and the user request processor 240, the remote USB information manager 210 provides the stored information to the remote USB connection controller 220 and the user request processor 240 to use the information for remote USB connection. Herein, the information managed by the remote USB information manager 210 includes an IP address of the remote USB bridge 100, USB port information, and information related to hardware of the USB device.

The virtual machine information manager 230 receives the information on the virtual machines that are being driven on the virtual machine host server 300 from the virtual machine host server and manages it. In addition, according to the requests from the remote USB connection controller 220 and the user request processor 240, the virtual machine manager 210 provides the stored information to the remote USB connection controller 220 and the user request processor 240 to use the information for remote USB connection. Herein, the information managed by the virtual machine information manager 230 includes an IP address, an operating system, and hardware related information of the virtual machine host server 300 and an IP address, an operating system, and hardware related information of the virtual machine.

The user request processor 240 processes a user's request for remote USB connection. For this, according to a request of a user who wants to access a predetermined USB device on the remote USB bridge 100, the user request processor 240 extracts information on the corresponding USB device from the remote USB information manager 210 and extracts information on a virtual machine of the corresponding user from the virtual machine information manager 230 and transfers it to the remote USB connection controller 220.

Herein, the user request processor 240 provides a user interface that allows a plurality of virtual machine users to read and select the USB devices connected to the remote USB bridge 100. That is, the user request processor 240 provides information on the USB devices connected to the remote USB bridge 100 to the user to allow the user to select any one USB device among the USB devices. In this case, when the user request processor 240 provides the information on the USB devices connected to the remote USB bridge 100 to the user, the information on the USB devices corresponds to USB devices except for the USB device which is occupied by other users.

Further, the user request processor 240 provides a user interface that allows the user to register his/her desired USB device type. That is, when the USB device having the type registered by the user is connected to the remote USB bridge 100, the user request processor 240 connects the corresponding USB device to a virtual machine of the corresponding user.

More specifically, the user request processor 240 receives a type of a predetermined USB device from the user and registers the type in the remote USB information manager 210. In addition, when the USB device having the corresponding type is plugged and played to the remote USB bridge 100, the remote USB information manager 210 notifies it the user request processor 240 and the user request processor 240 connects the corresponding USB device to the user's virtual machine.

Further, the user request processor 240 receives a remote USB bridge which the user wants to access from the user and registers it (registers an IP address of the corresponding remote USB bridge) and when the USB device is connected to the registered remote USB bridge, the user request processor 240 connects the USB device connected to the remote USB bridge to the user's virtual machine.

The remote USB connection controller 220 connects the user's virtual machine to a predetermined USB device on the remote USB bridge 100 by using the information extracted by the user request processor 240 under a control of the user request processor 240.

More specifically, the remote USB connection controller 220 transmits information on the USB device selected through the user request processor 240 in addition to the remote USB connection command to the virtual machine host server 300 and transmits the information on the user's virtual machine in addition to the remote USB connection command to the remote USB bridge 100 to connect the USB device used by the user with the user's virtual machine.

Figure 3:
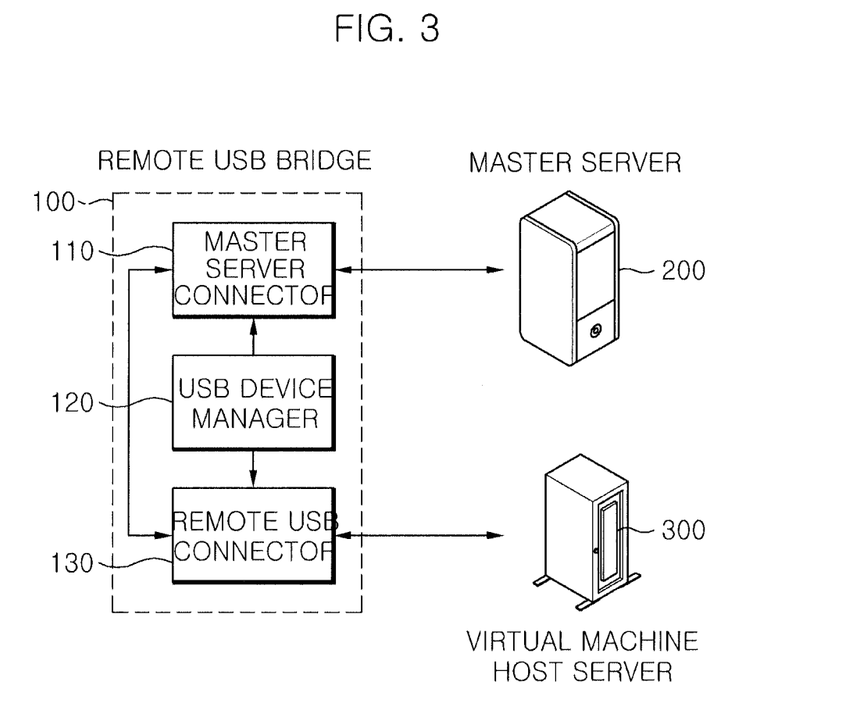
FIG. 3 is a diagram for describing a function of a remote USB bridge of FIG. 1 in detail.

FIG. 3 is a diagram for describing a function of a remote USB bridge of FIG. 1 in detail.

Referring to FIG. 3, the remote USB bridge 100 according to the embodiment of the present invention includes a master server connector 110, a USB device manager 120, and a remote USB connector 130.

The USB device manager 120 includes a plurality of USB ports (not shown) and manages information on USB devices connected to the plurality of USB ports. In this case, the USB device manager 120 operates by the plug and play scheme and recognizes the USB devices connected to the USB ports. Information managed by the USB device manager 120 includes the IP address of the remote USB bridge 100, the USB port information, and the information related to the hardware of the USB device.

The master server connector 110 receives the information on the USB device connected to the remote USB bridge 100 from the USB device manager 120 and transmits the information to the master server 200 and receives a remote USB connection command for connecting a predetermined virtual machine and information on the predetermined virtual machine (e.g., user's virtual machine) from the master server 200. In this case, the received information on the virtual machine includes the IP address, operating system, and hardware-related information of the virtual machine host server 300 and the IP address, operating system and hardware-related information of the corresponding virtual machine existing on the virtual machine host server 300.

When the remote USB connector 130 receives the remote USB connection command from the master server 200, the remote USB connector connects a predetermined USB device connected to the USB port with the corresponding virtual machine existing on the virtual machine host server 300 by using the information on the virtual machine received together with the remote USB connection command.

Figure 4:
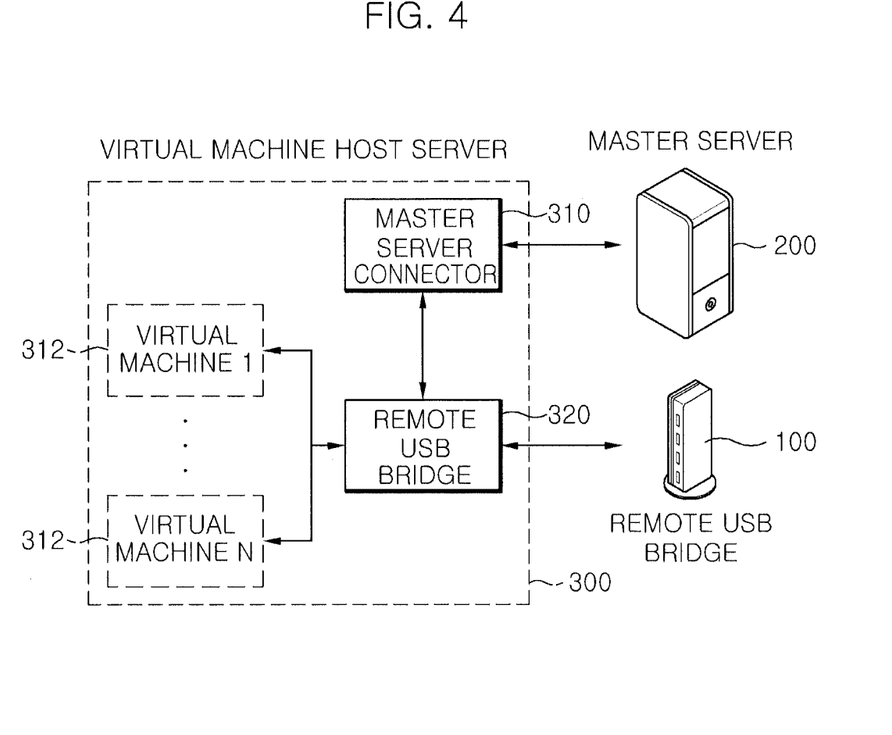
FIG. 4 is a diagram for describing a function of a virtual machine host server of FIG. 1 in detail.

FIG. 4 is a diagram for describing a function of a virtual machine host server 300 of FIG. 1 in detail.

Referring to FIG. 4, the virtual machine host server 300 includes a master server connector 310, a virtual machine 312, and a remote USB connector 320.

The master server connector 310 is connected with the master server 200 to transmit information on a virtual machine 312 that is being driven on the virtual machine host server 300 to the master server 200 and receive a remote USB connection command for connecting a predetermined USB device connected to the remote USB bridge 100 and information on the predetermined USB device (e.g., USB device selected by the virtual machine user) from the master server 200. In this case, the received information on the USB device includes the IP address of the remote USB bridge 100, USB port information of the corresponding USB device, and hardware-related information of the corresponding USB device.

When the remote USB connector 320 receives the remote USB connection command from the master server connector 310, the remote USB connector 320 connects a predetermined virtual machine that is being driven on the virtual machine host server 200 with the corresponding USB device connected to the remote USB bridge 100 by using the information on the USB device received together with the remote USB connection command.

Figure 5:
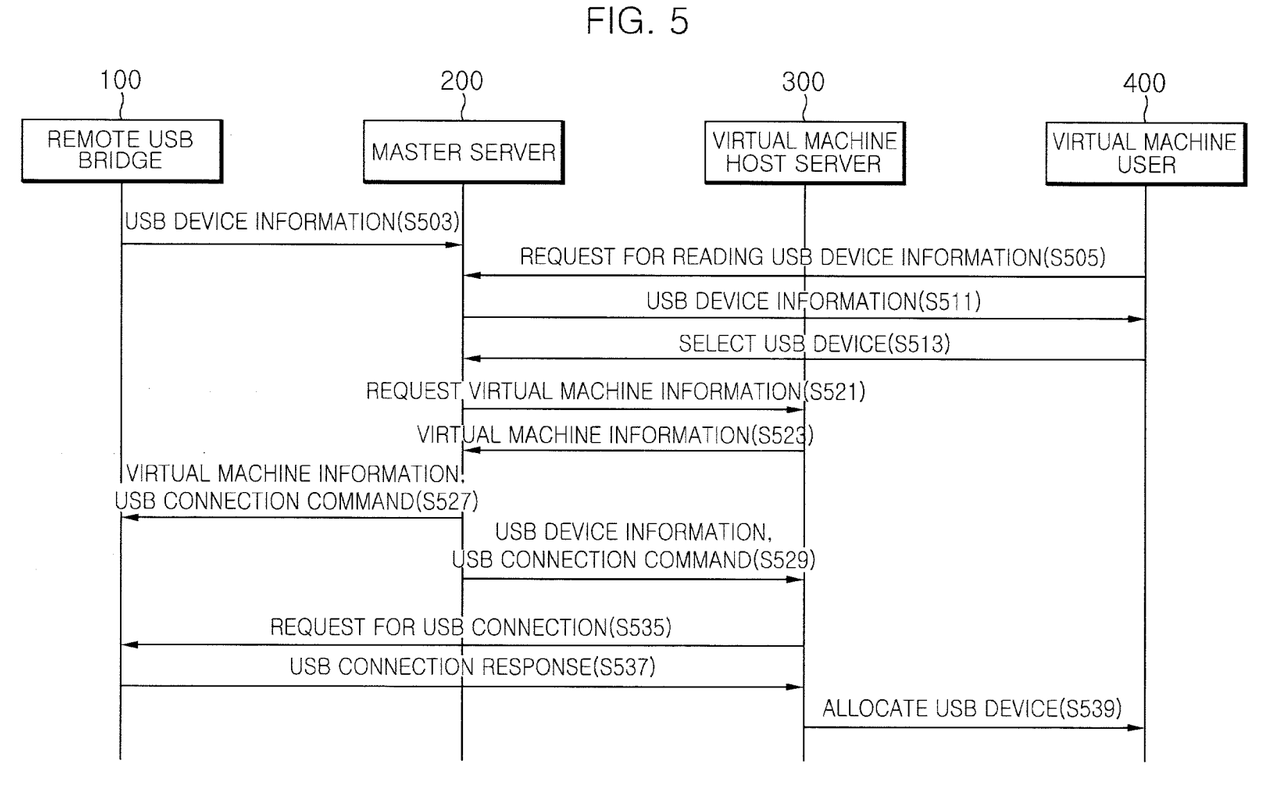
FIG. 5 is a flowchart for describing a method of allocating a remote USB device according to an embodiment of the present invention.

FIG. 5 is a flowchart for describing a method of allocating a remote USB device according to an embodiment of the present invention.

Referring to FIG. 5, a USB device manager of a remote USB bridge 100 transmits information on USB devices recognized by a plug and play scheme to a remote USB information manager of a master server 200 through a master server connector (S503). The information which the remote USB bridge 100 transmits to the master server 200 at step S503 includes an IP address of the remote USB bridge 100, USB port information, and information related to hardware of the USB device.

The master server 200 manages the collected information and allows a virtual machine user 400 of a virtual machine host server 300 to read USB devices connected to the remote USB bridge 300 by using a browser or an application program on the virtual machine.

More specifically, when the virtual machine user 400 requests the information on the USB devices to the master server 200 by using the browser or application program on the virtual machine (S505), the master server 200 provides the information on the USB devices connected to the remote USB bridge 100 to the virtual machine user 400 (S511). When the master server 200 provides the information on the USB devices connected to the remote USB bridge 100 to the virtual machine user at step S511, the master server 200 preferably provides the information while excluding information on USB devices which have been already used by other users or displaying a fact that other users have already used other USB devices in order to prevent a collision of a plurality of users.

Next, the virtual machine user 400 selects a desired USB device with reference to the information received from the master server 200 and transmits information on the selection of the USB device to the master server 200 (S513).

The master server 200 requests information on the virtual machine of the user 400 to the virtual machine host server 300 (S521) and thus receives the information on the virtual machine of the user 400 from the virtual machine host server 300 (S523). The information received by the master server 200 at step S523 includes the IP address, operating system, and hardware related information of the virtual machine host server 300 and the IP address, operating system, and hardware related information of the virtual machine of the user 400.

Meanwhile, although steps S521 and S523 are performed after step S513 in FIG. 5, steps S521 and S523 may be performed before step S505.

Next, a user request processor of the master server 200 transmits the information on the USB device selected by the virtual machine user 400 and the information on the virtual machine of the user 400 to a remote USB connection controller in addition to a remote USB connection command.

Therefore, the remote USB connection controller of the master server 200 transmits the information on the virtual machine of the user 400 and the remote USB connection command to the remote USB bridge 100 (S527) and transmits the information on the selected USB device and the remote USB connection command to the virtual machine host server 300 (S529) to allocate the USB device on the remote USB bridge 100 to the virtual machine of the user 400.

More specifically, the virtual machine host server 300 requests USB connection to the remote USB bridge 100 on the basis of the information received from the master server 200 (S535) and the remote USB bridge 100 thus transmits a USB response to the virtual machine host server 300 (S537) to establish communication connection between the remote USB bridge 100 and the virtual machine host server 300. In addition, the virtual machine host server 300 allocates the corresponding USB device to the virtual machine user 400 (S539).

Meanwhile, although the virtual machine host server 300 first requests USB connection to the remote USB bridge 100 in response to the remote USB connection command from the master server 200 in FIG. 5, the remote USB bridge 100 may first request USB connection to the virtual machine host server 300.

Figure 6:
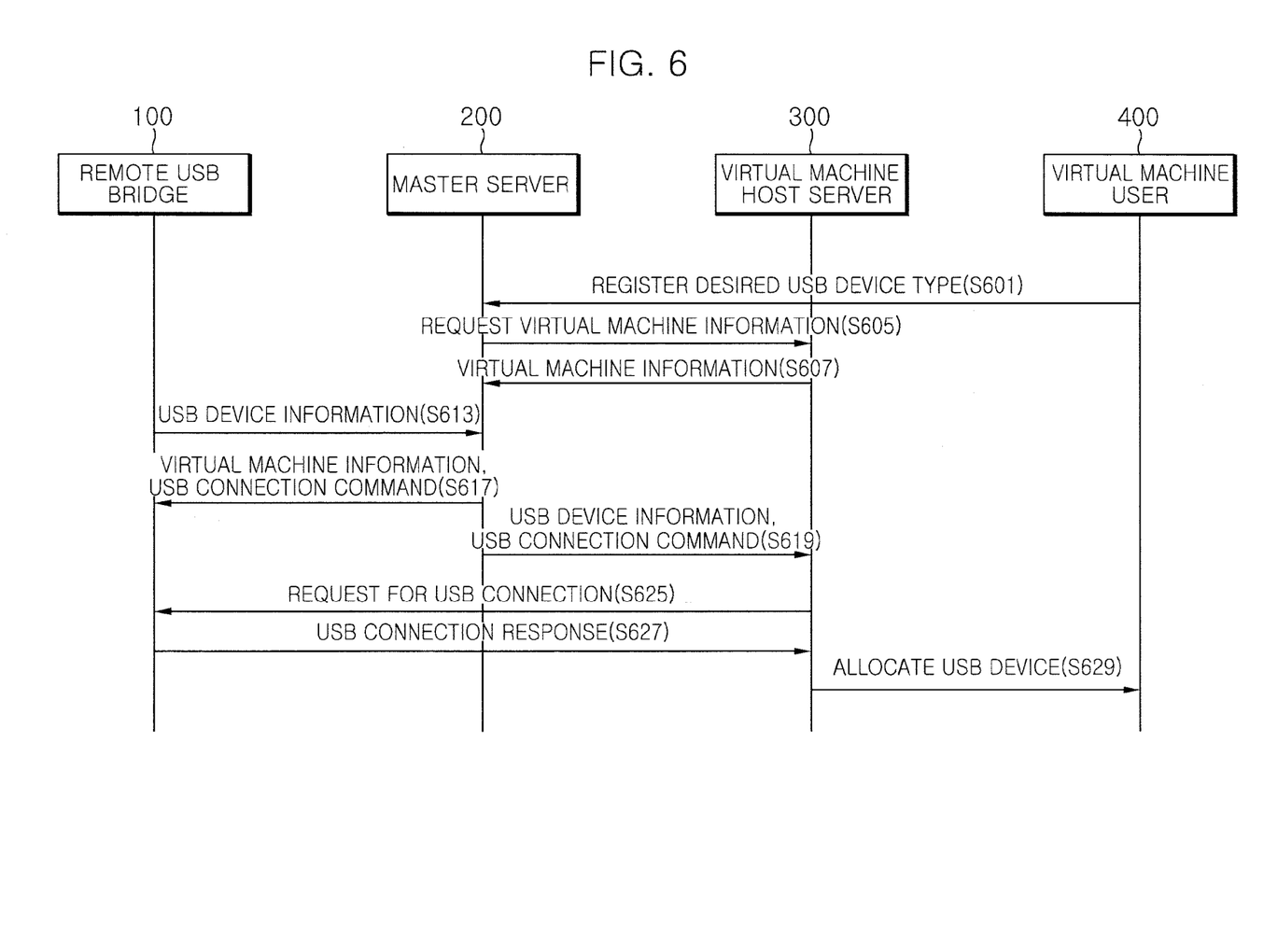
FIG. 6 is a flowchart for describing a method of allocating a remote USB device according to another embodiment of the present invention.

FIG. 6 is a flowchart for describing a method of allocating a remote USB device according to another embodiment of the present invention.

Referring to FIG. 6, the virtual machine user 400 on the virtual machine host server 300 registers a desired USB device type through the user request manager of the master server 200 or the master server connector of the virtual machine host server 300 by using the browser or application program on the virtual machine (S601). Only the former case is shown in FIG. 6.

Next, the master server 200 requests the information on the virtual machine of the user 400 to the virtual machine host server 300 (S605) and thus receives the information on the virtual machine of the user 400 from the virtual machine host server 300 (S607). The information received by the master server 200 at step S605 includes the IP address, operating system, and hardware related information of the virtual machine host server 300 and the IP address, operating system, and hardware related information of the virtual machine of the user 400.

Meanwhile, although steps S605 and S607 are performed after step S601 in FIG. 6, steps S605 and S607 may be performed before step S601.

Next, the master server 200 retrieves whether or not the corresponding USB device corresponding to the type registered by the virtual machine user 400 is connected to the remote USB bridge 100.

More specifically, the USB device manager of the remote USB bridge 100 recognizes the USB devices connected to the remote USB bridge 100 by the plug and play scheme and transmits the information on the recognized USB devices to the remote USB information manager of the master server 200 through the master server connector (S613).

Therefore, the remote USB information manager of the master server 200 transmits the received information to the user request manager and the user request manager retrieves whether or not the USB device corresponding to the type registered by the virtual machine user 400 exists among the USB devices connected to the remote USB bridge 100 by using the information received form the remote USB information manager.

According to the retrieval result, when the USB device having the type registered by the virtual machine user 400 exists, the master server 200 extracts information on the corresponding USB device and transmits the extracted information to the virtual machine host server 300 in addition to the remote USB connection command (S617).

Further, the master server 200 extracts the information on the virtual machine of the virtual machine user 400 and transmits the extracted information to the remote USB bridge 100 in addition to the remote USB connection command (S619).

Therefore, each of the virtual machine host server 300 and the remote USB bridge 100 operates its own remote USB connector to allocate the USB device (USB device having the type registered by the user) on the remote USB bridge 100 to the virtual machine of the user 400.

More specifically, the virtual machine host server 300 requests USB connection to the remote USB bridge 100 on the basis of the information received from the master server 200 (S625) and the remote USB bridge 100 thus transmits the USB response to the virtual machine host server 300 (S627) to establish communication connection between the remote USB bridge 100 and the virtual machine host server 300. In addition, the virtual machine host server 300 allocates the corresponding USB device to the virtual machine user 400 (S629).

Meanwhile, although the virtual machine host server 300 first requests USB connection to the remote USB bridge 100 in response to the remote USB connection command from the master server 200 in FIG. 6, the remote USB bridge 100 may first request USB connection to the virtual machine host server 300.

According to the present invention, the plug and play can be implemented with respect to a USB device having a predetermined type registered by a user and users using a plurality of virtual machines on a plurality of virtual machine hosts can use remote USB devices connected to a remote USB bridge like a local USB device.

Some steps of the present invention can be implemented as a computer-readable code in a computer-readable recording medium. The computer-readable recording medium includes all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, an optical magnetic storage device, etc. and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

As described above, the preferred embodiments have been described and illustrated in the drawings and the description. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A master server for supporting multiple virtual machines of multiple hosts, comprising:
    a remote USB information manager receiving information on a USB device connected to a remote USB bridge from the remote USB bridge and managing the received information;
    a virtual machine information manager receiving information of a user's virtual machine from a virtual machine host server and managing the received information, the information on the virtual machine including an IP address, an operating system, and hardware related information of the virtual machine and an IP address, an operating system, and hardware related information of the virtual machine host server;
    a user request processor, in accordance with a user request to access a predetermined USB device on the remote USB bridge, extracting information on the corresponding USB device from the remote USB information manager and extracting the information on the user's virtual machine from the virtual machine information manager; and
    a remote USB connection controller connecting the user's virtual machine to the predetermined USB device by using the information extracted by the user request processor,
    wherein the user request processor receives and registers a type of USB device which the user wants to connect from the user and when the USB device of the registered type is connected to the remote USB bridge, the user request processor connects the USB device of the registered type to a virtual machine of the user.

2. The master server for supporting multiple virtual machines of multiple hosts according to claim 1, wherein the information on the USB device includes an IP address of the remote USB bridge, USB port information, and information related to hardware of the USB device.

3. The master server for supporting multiple virtual machines of multiple hosts according to claim 1, wherein the user request processor provides information on the USB devices connected to the remote USB bridge to the user to allow the user to select any one USB device from the USB devices.

4. The master server for supporting multiple virtual machines of multiple hosts according to claim 3, wherein the information on the USB devices connected to the remote USB bridge corresponds to USB devices except for the USB device which is occupied by other users.

5. The master server for supporting multiple virtual machines of multiple hosts according to claim 3, wherein the information on the USB devices connected to the remote USB bridge includes information related to a USB device occupied by other users.

6. The master server for supporting multiple virtual machines of multiple hosts according to claim 1, wherein the user request processor receives and registers a remote USB bridge which the user wants to connect from the user and when the USB device is connected to the registered remote USB bridge, the user request processor connects the USB device connected to the remote USB bridge to the virtual machine of the user.

7. A remote USB bridge for supporting multiple virtual machines of multiple hosts, comprising:
    a USB device manager including a plurality of USB ports and managing information on USB devices connected to the USB ports;
    a master server connector receiving the information on the USB devices connected to the USB ports from the USB device manger and transmitting the information to a master server and receiving a remote USB connection command and information on a virtual machine of a user from the master server, the information on the virtual machine including an IP address, an operating system, and hardware related information of the virtual machine and an IP address, an operating system, and hardware related information of the virtual machine host server; and
    a remote USB connector connecting the USB devices connected to the USB ports to the virtual machine of the user existing on a virtual machine host server by using the received information on the virtual machine of the user when the remote USB connection command is received from the master server.

8. The remote USB bridge for supporting multiple virtual machines of multiple hosts according to claim 7, wherein the USB device manager operates by a plug and play scheme.

9. The remote USB bridge for supporting multiple virtual machines of multiple hosts according to claim 7, wherein the information on the USB device includes an IP address of the remote USB bridge, USB port information, and information related to hardware of the USB device.

10. A method of allocating a remote USB device in a remote USB system for supporting multiple virtual machines, comprising:
    receiving and storing, by a master server, information on USB devices connected to a remote USB bridge from the remote USB bridge;
    receiving and storing, by a master server, information of a user's virtual machine from a virtual machine host server, the information on the virtual machine including an IP address, an operating system, and hardware related information of the virtual machine and an IP address, an operating system, and hardware related information of the virtual machine host server;
    providing the stored information on the USB devices to the user in accordance with a request of a user and allowing the user to select any one USB device from the USB devices;
    extracting information on the selected USB device and transmitting the extracted information to the virtual machine host server in addition to a remote USB connection command; and
    extracting the information on the user's virtual machine and transmitting the extracted information to the remote USB bridge in addition to the remote USB connection command.

11. The method of allocating a remote USB device according to claim 10, wherein the stored information on the USB devices corresponds to USB devices except for the USB device which is occupied by other users.

12. The method of allocating a remote USB device according to claim 10, wherein the stored information on the USB devices includes information related to USB devices occupied by other users.

13. The method of allocating a remote USB device according to claim 10, wherein the information on the USB device includes an IP address of the remote USB bridge, USB port information, and information related to hardware of the USB device.

14. A method of allocating a remote USB device in a remote USB system for supporting multiple virtual machines, comprising:
    receiving and registering, by a master server, a desired type of a USB device from a user;
    receiving and storing, by a master server, information on a virtual machine of the user from a virtual machine host server, the information on the virtual machine including an IP address, an operating system, and hardware related information of the virtual machine and an IP address, an operating system, and hardware related information of the virtual machine host server;
    receiving information on USB devices connected to a remote USB bridge from the remote USB bridge to retrieve the USB device having the type registered by the user;
    when the USB device having the type registered by the user exists, transmitting information on the corresponding USB device to the virtual machine host server in addition to a remote USB connection command; and
    extracting the information on the user's virtual machine and transmitting the extracted information to the remote USB bridge in addition to the remote USB connection command.

15. The method of allocating a remote USB device according to claim 14, wherein the information on the USB device includes an IP address of the remote USB bridge, USB port information, and information related to hardware of the USB device.

* * * * *